United States Patent [19]

Auck

[11] Patent Number: 5,918,290

[45] Date of Patent: Jun. 29, 1999

[54] MULTI-PRODUCT SAMPLING APPARATUS AND METHOD

[75] Inventor: Rodney D. Auck, Austin, Tex.

[73] Assignee: The Porter Company/Mechanical Contractors, Manchaca, Tex.

[21] Appl. No.: 09/069,523

[22] Filed: Apr. 29, 1998

[51] Int. Cl.⁶ .................................................. G01N 1/00
[52] U.S. Cl. .......................................................... 73/863.81
[58] Field of Search ........................... 73/863.81, 863.83, 73/863.86; 239/106, 112, 113; 222/23, 159, 192; 134/22.12, 104.1, 169 C; 141/94, 98, 311 R

[56] References Cited

U.S. PATENT DOCUMENTS

| | | | |
|---|---|---|---|
| 3,776,284 | 12/1973 | Guyer et al. | 141/65 |
| 3,907,389 | 9/1975 | Cox et al. | 312/1 |
| 4,242,310 | 12/1980 | Greff et al. | 422/300 |
| 4,686,328 | 8/1987 | Ui et al. | 174/153 |
| 4,995,420 | 2/1991 | Wiggins | 137/360 |
| 5,017,197 | 5/1991 | McGuire et al. | 55/1 |
| 5,139,318 | 8/1992 | Broxup | 312/1 |
| 5,148,945 | 9/1992 | Geatz | 222/1 |
| 5,316,733 | 5/1994 | Rune et al. | 411/104 |
| 5,322,095 | 6/1994 | Bolz | 141/83 |
| 5,330,072 | 7/1994 | Ferri, Jr. et al. | 222/1 |
| 5,380,078 | 1/1995 | Baczkowski et al. | 312/1 |
| 5,417,346 | 5/1995 | Ferri, Jr. et al. | 222/61 |
| 5,460,439 | 10/1995 | Jennrich et al. | 312/1 |
| 5,465,766 | 11/1995 | Siegele et al. | 141/198 |
| 5,562,130 | 10/1996 | Peha et al. | 141/98 |

*Primary Examiner*—Robert Raevis
*Attorney, Agent, or Firm*—J. Nevin Shaffer, Jr.; Shaffer & Culbertson,LLP

[57] ABSTRACT

A multi-product sampling mechanism (10) having a clean valve (36), a sample cabinet (40) connected to the clean valve (36), and a utility cabinet (12) connected to the clean valve (36) and the sample cabinet (40) for controlling and cleaning the operation of the clean valve (36) and the sample cabinet (40). In a preferred embodiment, the sample cabinet (40) includes connection blanks (80) for the connection of additional sample cabinets (40) so that, if desired, more than one particular type of product or chemical can be received exclusively at a designated sample cabinet (40). Additionally, in a preferred embodiment, the clean valve (36) is connected a spacer connection (32) for connecting the clean valve (36) to a bulk-storage tank at the receiving facility. The spacer connection (32) is also connected to the utility cabinet (12). By means of the use of connecting tubing (16), cleansing fluid such as ultra-pure water is utilized to operate a spray gun (30) and inert gas such as nitrogen is utilized to operate the pneumatic valves, as well as for use of UPW followed by nitrogen gas to purge the connection tubing (16). As a result, the multi-product sampler (10) is capable of being automatically cleaned and ready for receipt of product after use. Further, the collection of a chemical sample is accomplished in a safe, sealed area and cleansing fluids and gases and chemicals flushed or spilled are directed to appropriate environmentally sensitive industrial waste or drum recovery facilities.

20 Claims, 7 Drawing Sheets

Figure 7

1. GN2 SAMPLE CABINET PURGE
The following valves will be actuated to the open position:

PV-14

2. CLEAN VALVE-UPW PURGE
The following valves will be actuated to the open position:

PV-1
PV-6
PV-9
PV-10
PV-11
PV-15

3. CLEAN VALVE-GN2 PURGE
The following valves will be actuated to the open position:

PV-1
PV-6
PV-8
PV-10
PV-11
PV-15

4. CLEAN VALVE CHEMICAL FLUSH TO DRUM RECOVERY
The following valves will be actuated to the open position:

PV-1
PV-5
PV-10

5. CLEAN VALVE CHEMICAL SAMPLE
The following valves will be actuated to the open position:

PV-1
PV-4
PV-10

6. SAMPLE PORT-UPW PURGE
The following valves will be actuated to the open position:

PV-3
PV-4
PV-9
PV-17

SEQUENCE OF OPERATION

7. SAMPLE PORT-GN2 PURGE
The following valves will be actuated to the open position:

PV-3
PV-4
PV-8
PV-17

8. HOSE-UPW PURGE(SPACER)
The following valves will be actuated to the open position:

PV-2
PV-6
PV-9
PV-12
PV-16

9. HOSE-GN2 PURGE(SPACER)
The following valves will be actuated to the open position:

PV-2
PV-6
PV-8
PV-12
PV-16

10. HOSE SPACER CHEMICAL FLUSH
The following valves will be actuated to the open position:

PV-2
PV-5
PV-13

11. HOSE SPACER CHEMICAL SAMPLE
The following valves will be actuated to the open position:

PV-2
PV-4
PV-13

12. PARTICLE COUNTER
The following valves will be actuated to the open position:

PV-2
PV-4
PV-7
PV-13

5,918,290

MULTI-PRODUCT SAMPLING APPARATUS AND METHOD

BACKGROUND OF THE INVENTION

This invention relates to a multi-product sampling apparatus for safely and cleanly transferring product from one location to another. In particular, this invention relates to a multi-product sampling apparatus and method for cleanly and safely transferring caustic chemicals and solvents from a delivery vehicle to a receiving industrial facility.

As previously set forth in applicant's co-pending application for A CLEAN CONNECTION AND SAMPLING APPARATUS AND METHOD, U.S. Ser. No. 08/969,149, the state of the art for the transfer of product from a delivery vehicle to a receiving facility is simply to connect a hose from the delivery vehicle to the receiving facility and off-load the product. In situations where the chemical purity of the product is not critical, this procedure is more than satisfactory. However, in many industries, the product consists of ultra-pure chemicals for use in industries such as fabrication facilities and the requirements for cleanliness are extraordinarily high. In such an environment, there exists a need for ensuring that the transfer of product does not itself introduce contaminants to the product and for ensuring that the product is contaminant free prior to transfer.

Again, in applicant's co-pending application an apparatus and method is disclosed to solve the problem of providing contaminant-free delivery of a product from an ISO truck wherein the apparatus is designed to be hard-connected to the ISO truck or move from site to site with the ISO truck. In this environment, a variety of structures are necessary to ensure the cleanliness of the transferring hose by means of iris ports. Further, operation of the apparatus is conducted by means of shielded gloves for manipulation of manual valves located within the contaminant free structure. Mechanisms for cleaning the ends of the connection tube are provided as well as for purging the sampling area prior to and after transfer. Nonetheless, a problem still remains in the industry for situations where product is to be transferred and the delivery vehicle does not have such a hard-connected device. Further, there is a problem with the use of shielded gloves for the operation of manual valves in that it is a somewhat costly and awkward procedure, as is the requirement for the use of iris ports to shield the sealed area from contamination.

Thus, there is a need in the art for providing a multi-product sampling apparatus which does not require the use of awkward iris ports and gloves, which is operable automatically and not solely by hand, and which is capable of providing clean and safe transference of multiple products. It, therefore, is an object of this invention to provide a multi-product sampling apparatus and method for use at receiving facilities that is useful with multiple products, enables safe and clean transference of product, and which is automatically operable.

SHORT STATEMENT OF THE INVENTION

Accordingly, the multi-product sampling device of the present invention includes a clean valve and a sample cabinet connected to the clean valve. A utility cabinet is connected to the clean valve and the sample cabinet and controls the cleaning and operation of the clean valve and the sample cabinet. In a preferred embodiment, the sample cabinet includes connection blanks for the connection of additional identical sample cabinets so that separate sample cabinets are available to receive a particular product time after time, thereby eliminating one source of contaminant, the product itself. Additionally, in a preferred embodiment, the clean valve also includes a spacer connection for connecting the clean valve to the receiver facility storage tank. The spacer connection is also connected to the utility cabinet. Again, in a preferred embodiment, the utility cabinet is automatically operable by means of pneumatic switches. Further, the utility cabinet, in a preferred embodiment, includes sources of cleansing liquid and gas for cleaning the clean valve, the sample cabinet, and the spacer connection. Likewise, in a preferred embodiment, the sample cabinet further includes an isolated sampling chamber for collecting samples of product prior to transfer to the storage tank. Also, the sample cabinet includes connections to industrial waste drains and to drum recovery systems, as will be disclosed more fully hereafter. Also, in a preferred embodiment, a monitor is provided, such as a sight glass, between the spacer connection and the storage tank so that visual monitoring of the transfer process is enabled.

BRIEF DESCRIPTION OF THE DRAWINGS

Other objects, features, and advantages of the present invention will become more fully apparent from the following detailed of the preferred embodiment, the appended claims, and the accompanying drawings in which:

FIG. 7 lists the sequence of operation of the multi-product sampling device of the present invention.

DETAILED DESCRIPTION OF THE PREFERRED EMBODIMENT

Figure 1:
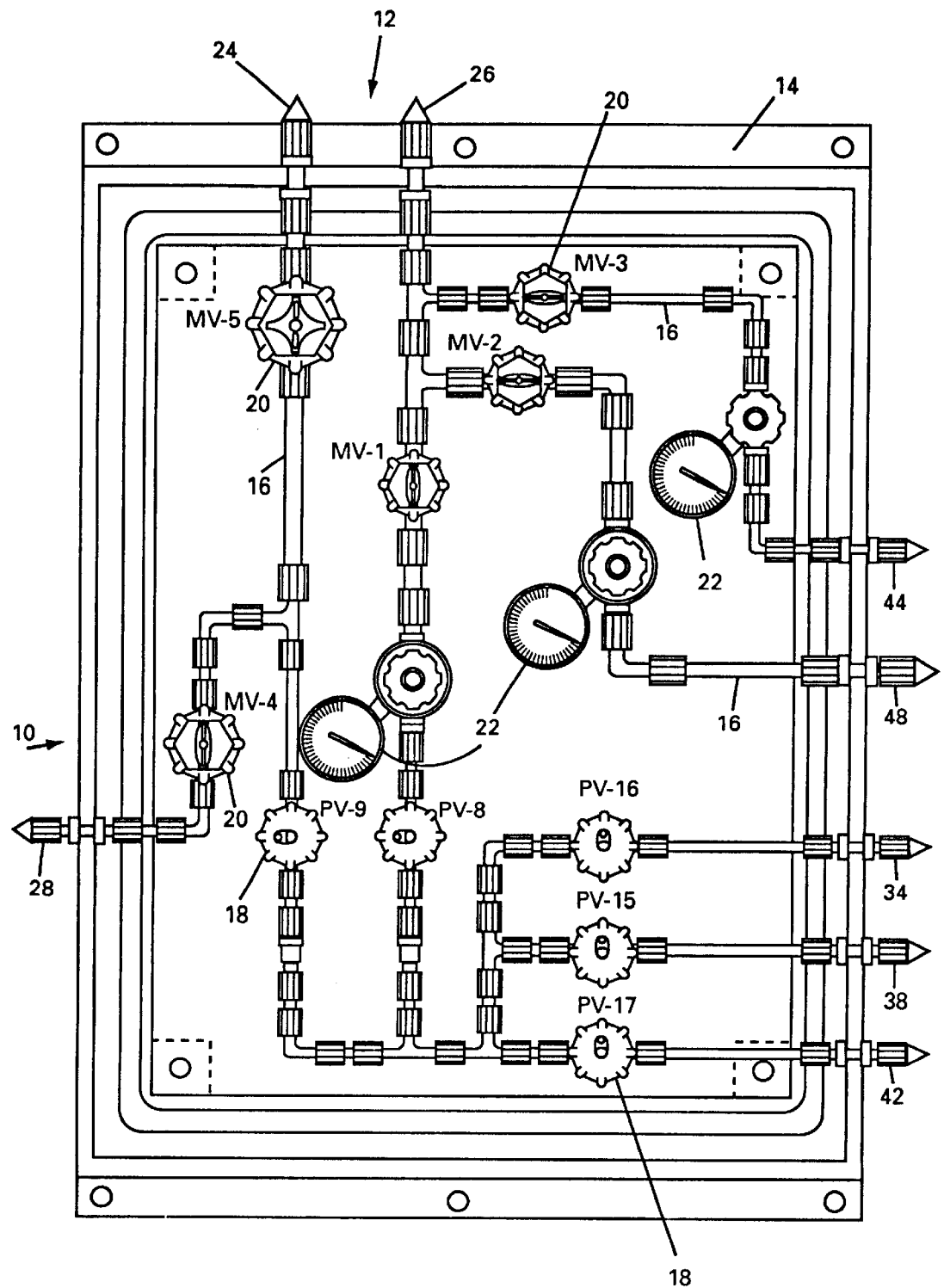
FIG. 1 is a front elevational view of the utility cabinet for the multi-product sampling device of the present invention.

The preferred embodiment of the present invention is illustrated by way of example in FIGS. 1–7. With specific reference to FIG. 1, multi-product sampler 10 includes utility cabinet 12 formed by frame 14 in the shape of a box. Frame 14 contains and supports connection tubing 16, pneumatic valves 18, manual valves 20, and pressure gauges 22. Connection tubing 16 is constructed so as to receive cleansing liquid, such as ultra-pure water ("UPW"), in at connection 24 and cleaning and operating gas, such as nitrogen ("GN2") or clean dry air, in at connection 26. From connection 24, UPW flows to connection 28 and ultimately to spray gun 30 (see FIG. 3).

Additionally, UPW is directed from connection 24 to spacer connection 32 (see FIG. 6) at connector 34 on frame 14. Also, UPW is directed to clean valve 36 (see FIG. 6) at connector 38. Further, UPW is directed to sample cabinet 40 (see FIGS. 2 and 3) at connector 42 on frame 14.

Similarly, GN2 introduced at connection 26 is directed through connection tubing 16 to spacer connection 32, clean valve 36, and sample cabinet 40 through connectors 34, 38, and 42, respectively. Additionally, GN2 is directed to sample cabinet 40 for the operation of pneumatic controls, as disclosed more fully hereafter in FIGS. 2 and 3, through connector 44. Also, GN2 is directed by means of connection tubing 16 to sample cabinet purge 46 (see FIG. 5) through connector 48.

As illustrated, manual valves 20, in normal operation, are aligned so as to allow the free passage of either UPW or GN2, relying on pneumatic valves 18 for the proper control of the liquid or gas. In a situation where manual isolation is required, manual valves 20 are available. Additionally, for the purposes of properly monitoring the gas pressure provided by the gas introduced at connection 26, appropriate pressure gauges 22 are provided for visual confirmation and regulation of GN2 pressure by a combination of gas pressure gauge and regulator valve as are known in the art and not disclosed more fully hereafter.

Frame 14 may be constructed of any sturdy, durable material resistant to chemical corrosion and environmental degradation. Utility cabinet 12 is designed so that frame 14 may be permanently attached to any appropriate location in the industrial facility where repetitive deliveries of chemicals require it. Frame 14 includes securing bolt/screw holes 50 for the purpose of holding utility cabinet 12 securely in one place.

Figure 2:
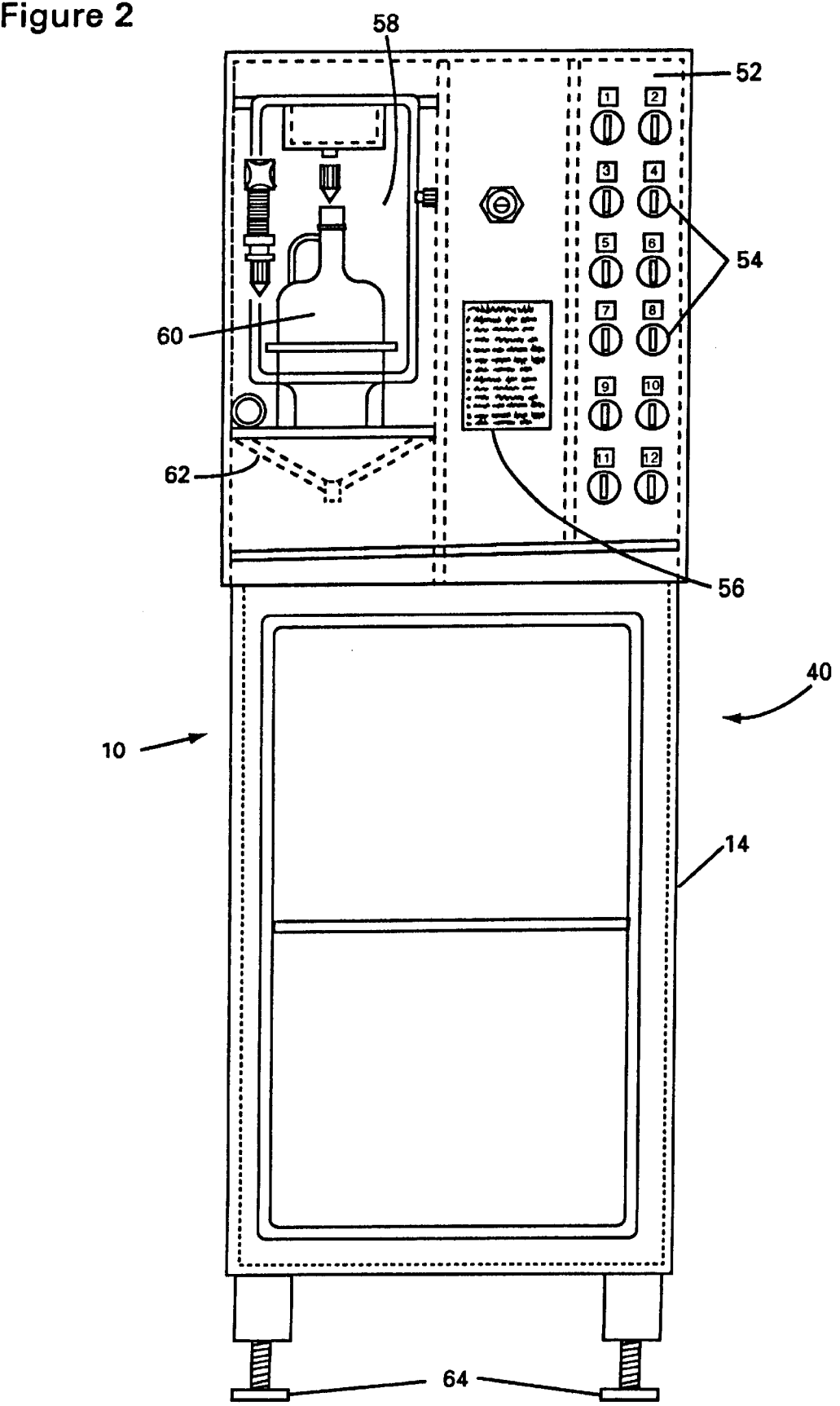
FIG. 2 is a front view of the sample cabinet.
Figure 3:
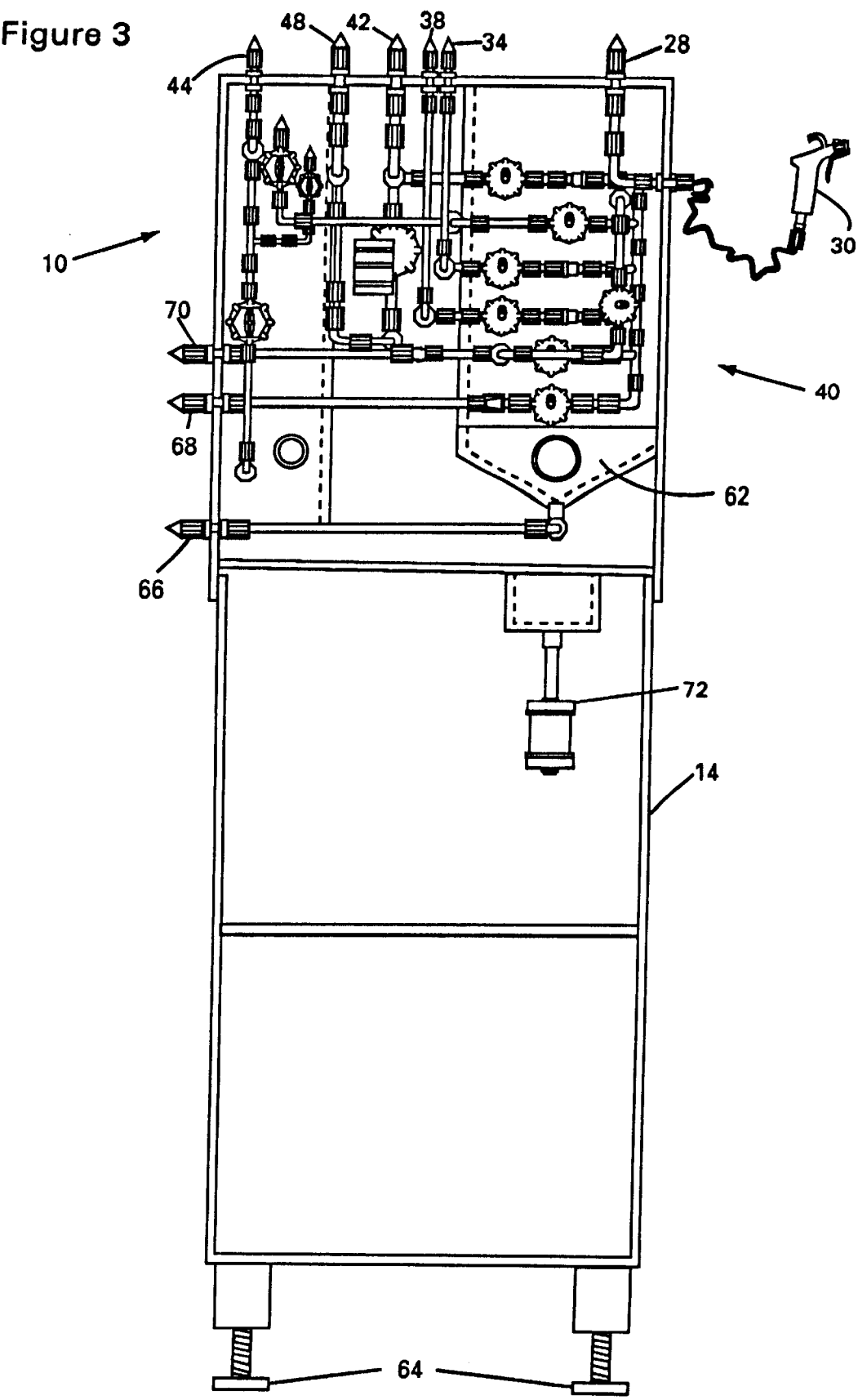
FIG. 3 is a back view of the sample cabinet.

Referring now to FIGS. 2 and 3, sample cabinet 40 is illustrated. FIG. 2 illustrates the front of sample cabinet 40 including control panel 52 containing momentary switches 54. Control panel 52 also includes instructions 56 for the operation of momentary switches 54. Also illustrated is interior isolated sampling chamber 58 within which is situated sampling jug 60. Interior isolated sampling chamber 58 has a sump 62 for the collection of UPW, cleaning liquid, or spilled or overflow product. Frame 14 of sample cabinet 40 is constructed of any rigid, impervious material, as utility cabinet 12, and includes any desirable configuration such as an adjustable-height, rectangular shaped, box as illustrated. The height may be adjustable in any known manner such as by screw-in and screw-out adjustable legs 64. Referring now to FIG. 3, it is illustrated that sample cabinet 40 includes corresponding UPW connector 28 for the direction of UPW to spray gun 30. Likewise, GN2 connector 44 for the operation of sample cabinet 40 momentary switches 54 is illustrated along with GN2 purge connector 48. Combined GN2 and UPW flushing connectors 34 (to spacer connection 32), 38 (to clean valve 36), and 42 (to sample cabinet 40) are also illustrated.

Additionally, sample cabinet 40 contains connecting tubing 16 for the direction of waste or product as follows: Connector 66 directs waste and/or residue product from sump 62 by means of gravity flow to an industrial waste reservoir. Connector 68 directs waste and/or samples to an industrial waste reservoir by means of force. Connector 70 directs product to drum recovery. Also illustrated is sump drain valve 72.

Figure 4:
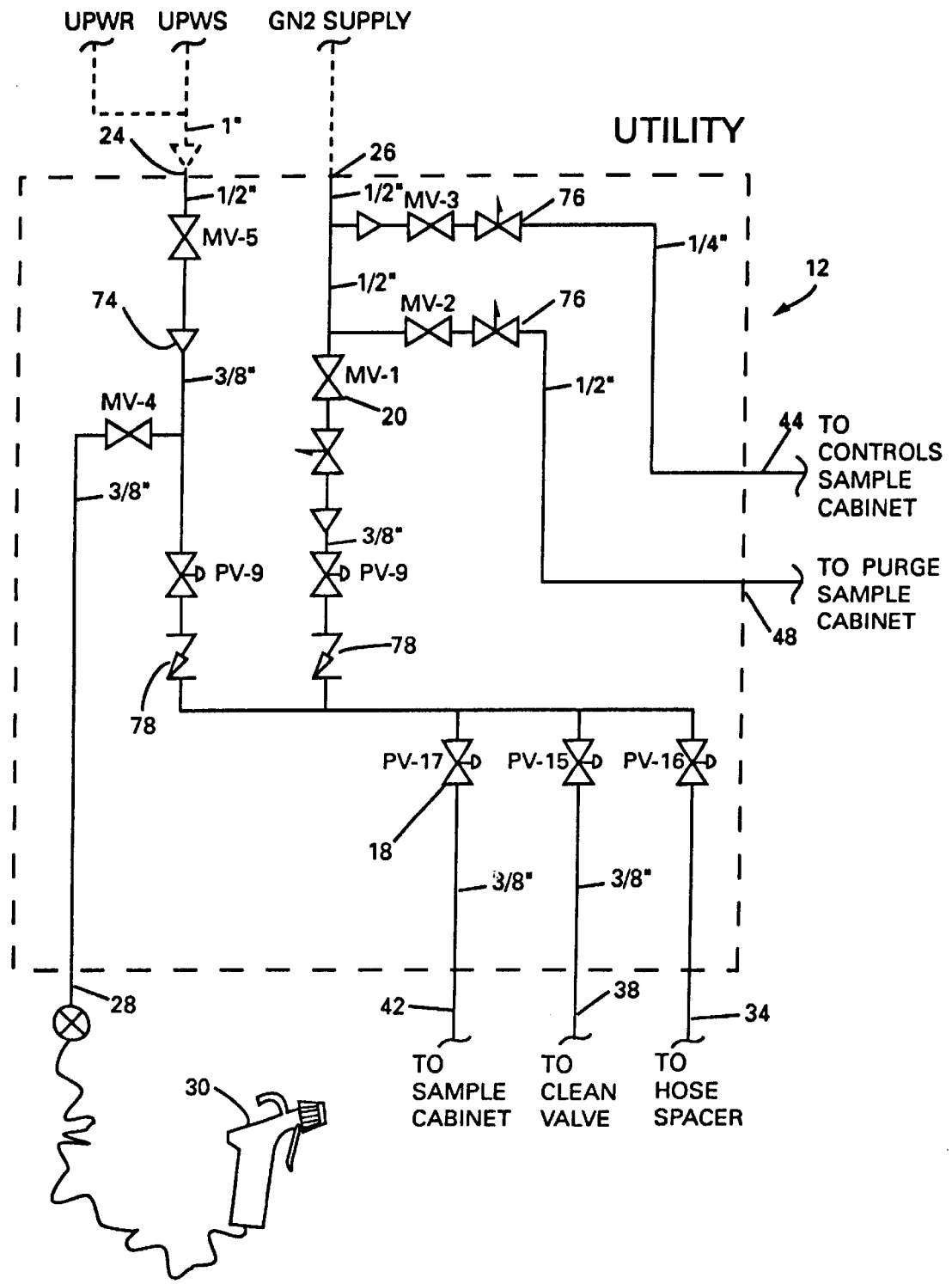
FIG. 4 is a schematic drawing of the utility cabinet.

Referring now to FIG. 4, a schematic for utility cabinet 12 is shown illustrating the preferred structure for connecting tubing 16, pneumatic valves 18, manual valves 20, and assorted reducers 74, regulator valves 76, and check valves 78.

Figure 5:
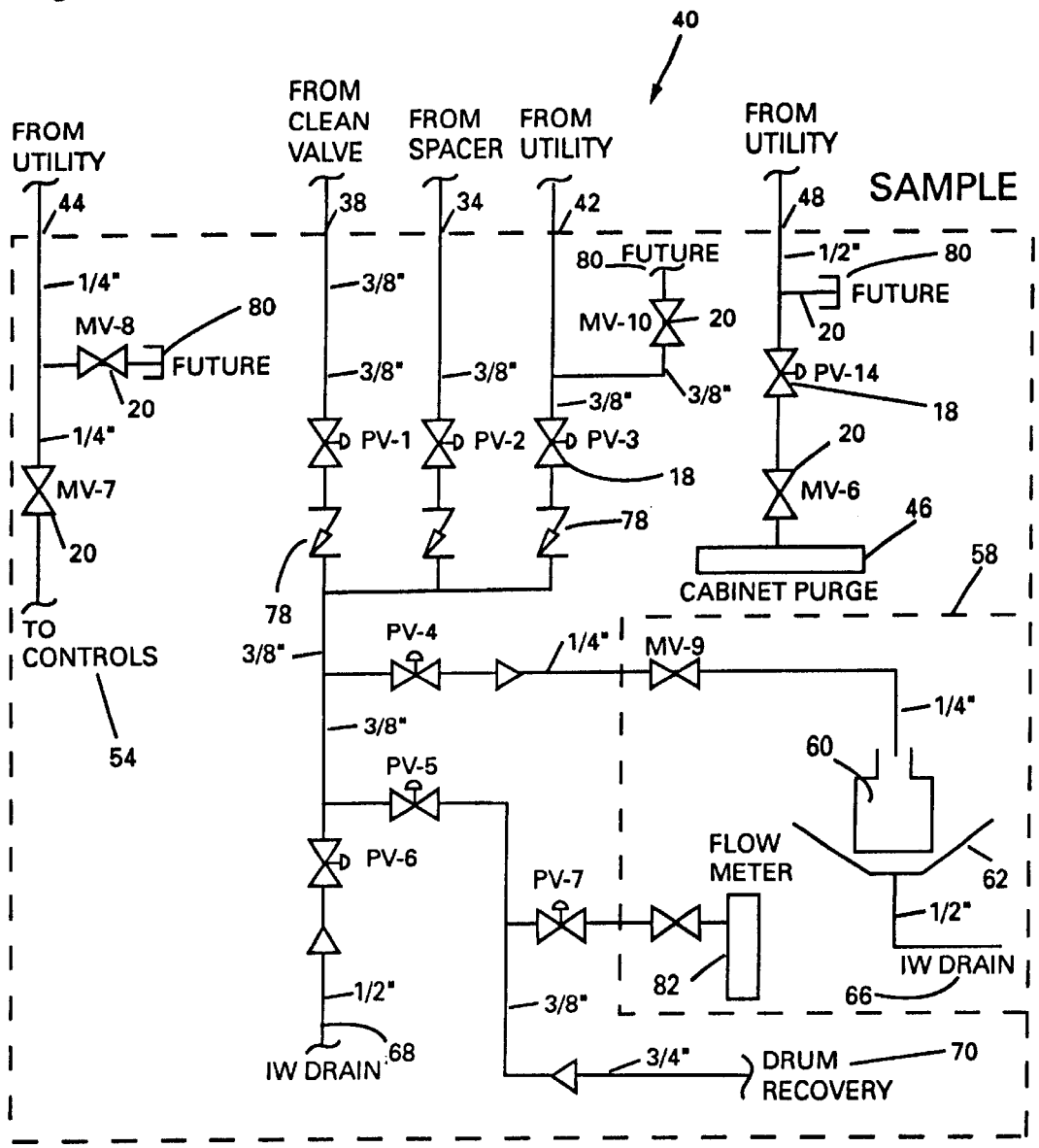
FIG. 5 is a schematic drawing of the sample cabinet.

FIGS. 4 and 5 also illustrate the points at which connectors 24, 26, 28, 34, 38, 42, 44, and 48 occur, as previously illustrated in FIG. 1.

FIG. 5 also illustrates the preferred embodiment of multi-product sampler 10 wherein connection blanks 80, isolated by manual valves 20, are provided in connection tubing 16 so that additional sample cabinets 40 may be added one after the other. This solves a long-felt need in the industry for providing a multi-product sampler 10 which can be expanded so as to provide sample cabinets 40 which are dedicated to specific product only. Also, connection blanks 80 allow expansion of sample cabinets 40 where simply more product is to be tested, as disclosed herein, than can be handled by a single unit.

FIG. 5 also illustrates the preferred embodiment of the invention wherein flow/particle meter 82 is provided located within interior isolated sampling chamber 58.

Figure 6:
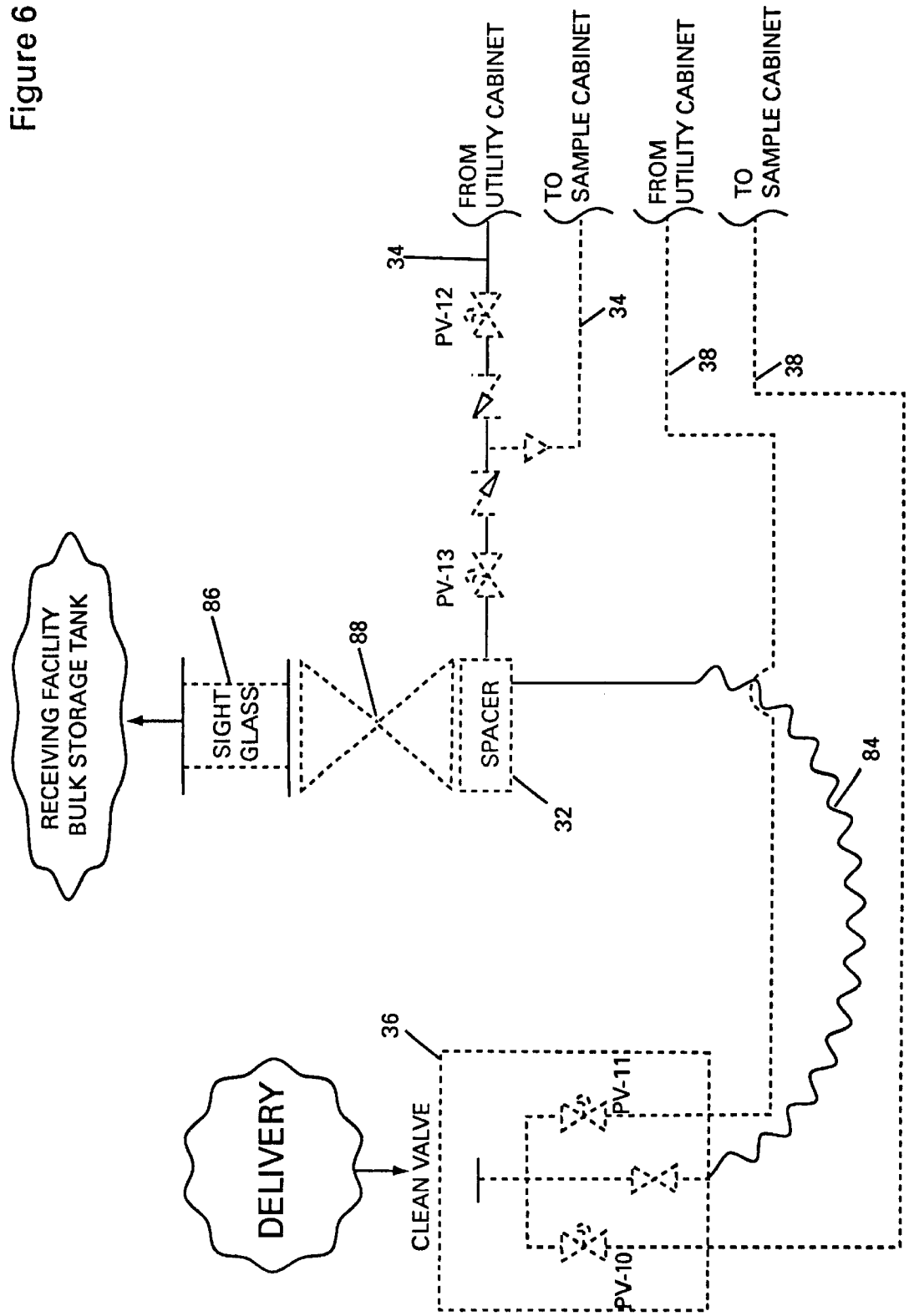
FIG. 6 is a schematic drawing of the clean valve, spacer connection, and flow monitor of the present invention.

Referring now to FIG. 6, clean valve 36 and spacer connection 32 are illustrated. Connection tubing 16 shows connector 34 coming in from utility cabinet 12 to spacer 32 and returning from spacer 32 to sample cabinet 40 at connector 34. Additionally, connector 38 from utility cabinet 12 is shown coming in to clean valve 36 and returning to sample cabinet 40 by means of connector 38.

FIG. 6 also illustrates product delivery hose 84 connecting clean valve 36 with spacer connection 32. Also, in a preferred embodiment, a monitor 86 is provided for visual monitoring of the delivery of product from clean valve 36 through spacer connection 32 to a receiver (not shown) such as a bulk-storage tank at the receiving facility. Monitor 86 can be any monitor known in the art such as a common sight glass.

Referring now to FIG. 7, the sequence of operation of multi-product sampler 10 for the preparation of multi-product sampler 10 for the testing of product and the obtaining of a sample is disclosed. Pneumatic valves 18, as illustrated, are referred to by their numbers as occurring on the illustrations.

In operation, utility cabinet 40 is closed and, when UPW connector 24 and GN2 connector 26 are properly provided and correct pressures obtained by pressure gauges/regulators 22, sample cabinet 40 is purged with GN2 by depressing momentary switch 54 (number 1 on control panel 52) and holding it so that pneumatic valve 18 (PV-14 as illustrated in FIG. 5) is open and cabinet purge 46 is actuated to purge sample cabinet 40. As is the case with all momentary switches 54, when momentary switch 54 (number 1 on control panel 52) is released, pneumatic valve 18 (number PV-14) closes.

Next, momentary switch 54 (number 2 on control panel 52) is depressed and held depressed thereby actuating pneumatic valves 18 (numbers PV-1, PV-6, PV-9, PV-10, PV-11, and PV-15 as illustrated in FIGS. 4, 5, and 6) so that clean valve 36 is purged with a cleansing liquid such as UPW.

Next, momentary switch 54 (number 3 on control panel 52) is held depressed so as to operate pneumatic valves 18 (numbers PV-1, PV-6, PV-8, PV-10, PV-11, and PV-15) so as to purge clean valve 36 with an inert gas such as GN2. In both the case of the UPW purge and the GN2 purge, waste water and gas are directed to connector 68 for the forced industrial waste drain. 1I Next in sequence is the momentary switch 54 (number 4 on control panel 52) which actuates pneumatic valves 18 (numbers PV-1, PV-5, and PV-10) in the open position so as to flush some of the product to drum recovery through connector 70. At that point, momentary switch 54 (number 5 on control panel 52) is depressed which actuates pneumatic valves 18 (PV-1, PV-4, and PV-10) so as to direct a chemical sample to sample cabinet 40, interior isolated sampling chamber 58, and sampling jug 60.

Next, the connecting tubing 16 to interior isolated sampling chamber 58 is purged by the use of momentary switch 54 (number 6 on control panel 52) which actuates pneumatic valves 18 (numbers PV-3, PV-4, PV-9, and PV-17) so as to purge those lines with UPW. The UPW used in the purge is directed to connector 66 for direction to a gravity industrial waste recovery, as collected by sump 62. Thereafter, momentary switch 54 (number 7 on control panel 52) is depressed so as to purge connection tubing 16 to interior isolated sampling chamber 58 by actuation of pneumatic valves 18 (numbers PV-3, PV-4, PV-8, and PV-17). This waste is also directed through connector 66 to gravity industrial waste recovery.

Next, momentary switch 54 (number 8 on control panel 52) is held down so as to actuate pneumatic valves 18 (numbers PV-2, PV-6, PV-9, PV-12, and PV-16) so as to purge spacer connection 32 connecting tubing 16 with UPW to connector 68 for forced industrial waste recovery. Thereafter, momentary switch 54 (number 9 on control panel 52) is depressed so as to actuate pneumatic valves 18 (numbers PV-2, PV-6, PV-8, PV-12, and PV-16) so as to purge spacer connection 32 and connection tubing 16, with GN2. This purge is also directed to connector 68 forced industrial waste recovery.

With the connection tubing 16 purged, momentary switch 54 (number 10 on control panel 52) is depressed so as to actuate pneumatic valves 18 (numbers PV-2, PV-5, and PV-13) so as to direct product through clean valve 36 through delivery hose 84 to sample cabinet 34 and product drum recovery through connector 70. Having thereby purged and flushed connection tubing 16, another chemical sample can be obtained by holding momentary switch 54 depressed (number 11 on control panel 52) so as to actuate pneumatic valves 18 (numbers PV-2, PV-4, and PV-13) so as to direct a collection of a chemical sample by means of sampling jug 60.

Additionally, as desired, analysis of the product can be obtained by use of flow meter 82 within interior isolated sampling chamber 58 by depressing momentary switch 54 (number 12 on control panel 52) so as to actuate pneumatic valves 18 (numbers PV-2, PV-4, PV-7, and PV-13).

Once the operator has assured himself or herself that the product meets the required specifications, by on or off-site analysis of the sample collected in sampling jug 60 by any means known in the art, product is delivered through clean valve 36, through delivery hose 84, through spacer 32, through delivery valve 88, and, preferably, through sight glass monitor 86 to a bulk-storage tank at the receiving facility (not shown). Sight glass monitor 86 is useful in that if, for example, the product is being delivered by means of pressurized gas, once the entrained gas is noticed in sight glass 86, delivery can be halted. At that point, multi-product sampler 10 can be returned to useful condition by means of the preparatory sequence of operation as set forth in FIG. 7. It should be understood that multi-product sampler 10 can easily accommodate various, different forms of product through a single multi-product sampler 10. Nonetheless, in some cases, it is desirable that sample cabinet 40 be utilized with only one particular type of chemical. Where more than one type of chemical is required by a receiving facility, the use of connection blanks 80 enables the expansion of multi-product sampler 10 to accommodate any number of additional sample cabinets 40.

While the multi-product sampling apparatus and method of the present invention has been disclosed in connection with the use of the delivery of any particular product, the multi-product sampler 10 of the present invention has particular application in the field of the delivery and receipt of ultra-pure chemicals, such as in the fabrication business. In this industry, a primary source of contamination occurs at the point at which the product is delivered to the receiving facility. In some cases, the product is contaminated in the delivery unit or at the delivery connection. By means of multi-product sampler 10, the detection of either an entirely contaminated product or a contaminated receiving problem, such as connections 16 or hose 84 containing residue from a prior delivery, is easily, safely, simply and economically detected and corrected. The system is environmentally sensitive in that it contains cleaning fluids and spills and directs them to appropriate recovery or refuse locations. Further, because the system is totally pneumatic, no source of electrical shock or explosion or the like is inherent. As a result, chemicals are handled safely while extracting a sample so as to ensure uncontaminated product is delivered and received.

While the present invention has been disclosed in connection with the preferred embodiment thereof, it should be understood that there may be other embodiments which fall within the spirit and scope of the invention as defined by the following claims.

I claims:

1. A multi-product sampling apparatus comprising:
   (a) a clean valve means;
   (b) a sample cabinet means connected to said clean valve means; and
   (c) a utility cabinet means, connected to said clean valve means and said sample cabinet means, for controlling the cleaning and operation of said clean valve means and said sample cabinet means.

2. The apparatus of claim 1 wherein said sample cabinet means further comprises connection blanks for the connection of additional sample cabinet means.

3. The apparatus of claim 2 wherein said clean valve means further comprises a spacer connection means for connecting said clean valve means to a storage tank means, said spacer connection means also connected to said utility cabinet means.

4. The apparatus of claim 3 wherein said utility cabinet means further comprises pneumatically operable switches.

5. The apparatus of claim 4 wherein said pneumatically operable switches are operated by means of an inert gas.

6. The apparatus of claim 5 wherein said inert gas is selected from a group including nitrogen and clean dry air.

7. The apparatus of claim 3 wherein said utility cabinet means further comprises sources of cleansing liquid and gas for cleaning said clean valve means, said sample cabinet means, and said spacer connection means.

8. The apparatus of claim 7 wherein said utility cabinet means further comprises a gas purge connection with said sample cabinet means for purging said sample cabinet means.

9. The apparatus of claim 7 wherein said cleansing liquid is ultra-pure water and said gas is nitrogen.

10. The apparatus of claim 7 wherein said sample cabinet means further comprises a cleansing liquid connection to a hand spray means.

11. The apparatus of claim 3 wherein said sample cabinet means further comprises an isolated sampling chamber means for collecting samples of product prior to transfer to said storage tank means.

12. The apparatus of claim 11 wherein said isolated sampling chamber means further comprises a flow meter means.

13. The apparatus of claim 3 wherein said sample cabinet means further comprises connections to industrial waste drain means and drum recovery means.

14. The apparatus of claim 3 further comprising a monitoring means for monitoring flow of product to said storage tank means.

15. In the field of transferring chemicals for industrial use, an expandable multi-chemical sampling apparatus for sampling chemicals in a clean environment prior to off-loading a chemical to a bulk-storage container at an industrial site comprising:

(a) a clean valve means;

(b) a spacer connection means for connecting said clean valve means to the bulk-storage container;

(c) a sample cabinet means for sampling the chemical, connected to said clean valve means;

(d) connection blanks connected to said sample cabinet means for connection of additional sample cabinet means;

(e) an isolated sampling chamber means within said sample cabinet means for collecting samples of the chemical prior to transfer to the bulk-storage container;

(f) a utility cabinet means connected to said clean valve means and said sample cabinet means for controlling the cleaning and operation of said clean valve means, said sample cabinet means, and said spacer connection means;

(g) pneumatically operable switches connected to said utility cabinet means;

(h) sources of cleansing liquid and gas connected to said utility cabinet means for cleaning said clean valve means, said sample cabinet means, and said spacer connection means; and (i) a monitoring means for monitoring the flow of the chemical to the bulk-storage container.

16. The apparatus of claim 15 wherein said pneumatically operated switches are operated by means of an inert gas.

17. The apparatus of claim 15 wherein said cleaning liquid is ultra-pure water and said gas is nitrogen.

18. The apparatus of claim 15 wherein said sample cabinet means further comprises a cleaning liquid connection to a hand spray means.

19. A multi-product sampling method comprising the steps of:

(a) providing a clean valve means;

(b) providing a sample cabinet means and connecting said sample cabinet means to said clean valve means;

(c) connecting a utility cabinet means to said clean valve means and said storage cabinet means, for controlling the cleaning and operation of said clean valve means and said sample cabinet means;

(d) connecting a product to be delivered to said clean valve means;

(e) operating said utility cabinet means to first clean said clean valve means and said sample cabinet means and then allow product to pass through said clean valve means to said sample cabinet means;

(f) obtaining a sample of said product in said sample cabinet means and testing said sample;

(g) connecting said clean valve means to a delivery means for receiving said product; and (h) opening said clean valve means so that product to be delivered is transferred to said storage tank means after testing.

20. The method of claim 19 further comprising the steps of:

(a) providing pneumatically operated switches for operation of said utility cabinet means; and (b) connecting a monitoring means between said clean valve means and said storage tank means for monitoring the flow of product to said storage tank means.

* * * * *